E. C. SHAW.
VEHICLE WHEEL RIM.
APPLICATION FILED MAY 2, 1910.
1,059,575. Patented Apr. 22, 1913.
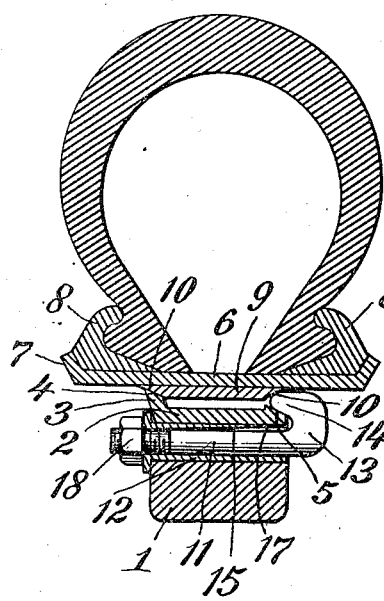
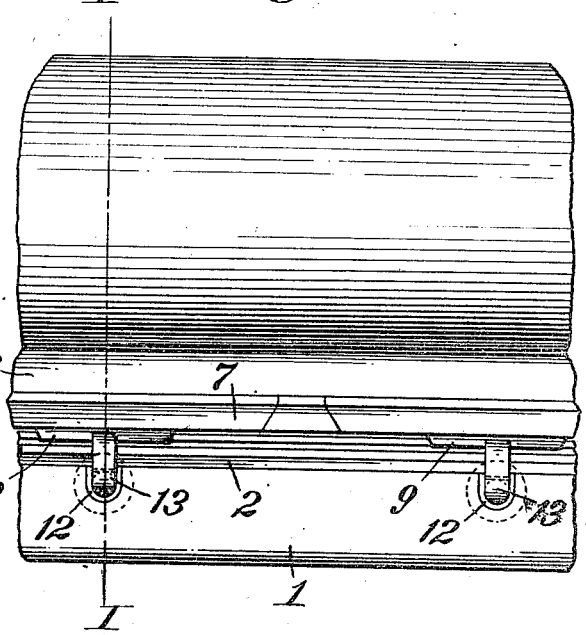
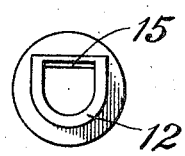
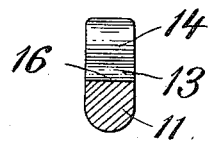
Attest: Edwin C. Shaw Inventor:
by Seward Davis Atty.

UNITED STATES PATENT OFFICE.

EDWIN C. SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE WHEEL-RIM.

1,059,575.  Specification of Letters Patent.  Patented Apr. 22, 1913.

Application filed May 2, 1910. Serial No. 558,974.

*To all whom it may concern:*

Be it known that I, EDWIN C. SHAW, a citizen of the United States, residing in Akron, county of Summit, and State of Ohio, have invented certain new and useful Improvements in Vehicle Wheel-Rims, of which the following is a specification.

This invention relates to vehicle wheel rims of the type designed primarily for carrying pneumatic or other resilient tires in which a portion of the rim carrying the tire can be removed from the wheel and a new tire and rim portion substituted. Rims of this type are commonly known as demountable rims.

In the accompanying drawings, which form a part of this specification, Figure 1 is a section through a wheel felly, rim and tire illustrating one embodiment of my invention, the section being taken on line I—I of Fig. 2; Fig. 2 is a side elevation of a portion of the wheel felly, rim and tire shown in Fig. 1; Fig. 3 is a detail end view of the bushing on an enlarged scale; Fig. 4 is a transverse section of the bolt looking in the direction of the wedge-shaped head.

Referring to the drawings in detail, the numeral 1 designates the wheel felly, to which is permanently secured the fixed rim member or band 2 having at one side thereof the flange 3 provided with the inclined upper surface 4, and having at the other side a downwardly inclined or tapered surface 5. The tire carrying portion or rim proper may be of any suitable construction, that shown comprising a split band 6 having side flanges 7 which serve to retain the tire retaining flanges 8. The band 6 has secured to its under surface a plurality of members or plates 9 having beveled faces 10, one of which engages with the inclined face 4 on the flange 3, while the other of which is opposed to the inclined face 5 on the fixed band. If desired a single strip of the cross section of the plates 9 extending entirely around the wheel may be substituted for the plates. Means for retaining the detachable rim upon the wheel comprise a plurality of bolts 11 which are mounted in bushings 12 carried by the felly, the bolts having hooked heads 13, the extremities 14 of which are given a wedge-shape capable of entering the space between the faces 10 of plates 9 and the face 5 of the fixed band 2. The bushings are provided with flat sides 15 adapted to be engaged by corresponding flat sides 16 on the bolts to prevent the rotation of the latter, the openings through the bushings being enlarged toward the hooked ends of the bolts, as indicated at 17, in order to permit some freedom of movement to the wedge portions of the bolts. The wedge-shaped extremities 14 are thus permitted to ride up upon the inclined surface 5, when the bolts are drawn into operative position, and to seat evenly between the two rims. Nuts 18 are used to retain the bolts in position.

The construction which I have above described provides a very simple and efficient means for mounting a rim upon a wheel in such manner that it may be readily removed and replaced. To remove the rim it is simply necessary to unscrew the nuts 18 and withdraw the wedge bolts 11. When the rim has been replaced the bolts are again inserted, the wedge portions entering between the oppositely inclined surfaces of the band 2 and plates 9, where they are permitted to find a firm bearing by reason of the freedom of movement allowed between the bolts and their bushings. The nuts 18 are then screwed to the projecting ends of the bolts, drawing them home and wedging the detachable rim firmly upon the wheel.

Having thus described a preferred embodiment of my invention, but without desiring to limit myself to the exact details set forth and illustrated, I claim:

1. In a vehicle wheel, in combination, a fixed wheel member having an opening therethrough, a detachable tire carrying rim seated on said wheel member, a bolt passing through the opening in said wheel member and having a hooked head entering a space between said wheel member and rim, the portion of said opening adjacent to said hooked head being enlarged to a dimension in a direction radial to said wheel greater than the corresponding dimension of the bolt, the enlargement of the opening extending from the side of the wheel member adjacent to the bolt-head toward the other side thereof a distance sufficient to permit of limited movement of the bolt-head in a radial direction.

2. In a vehicle wheel, in combination, a fixed wheel member, a detachable tire carrying rim seated thereon, a flat-sided bushing projecting through an opening in said wheel member, and a flat-sided bolt passing through said bushing, said bolt having a head engaging said detachable rim.

EDWIN C. SHAW.

Witnesses:
WALTER K. MEHUS,
MARCUS H. HILL.

Copies of this patent may be obtained for five cents each, by addressing the "Commissioner of Patents, Washington, D. C."